May 31, 1960
P. W. JOHNSON
2,938,698
DIAL INDICATOR STEM MOUNT
Filed May 13, 1958
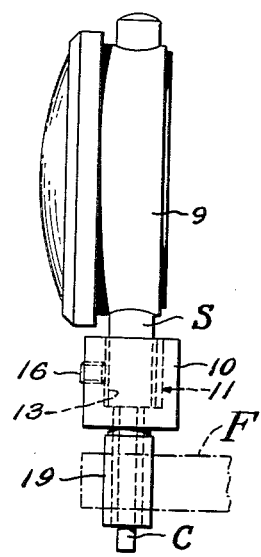
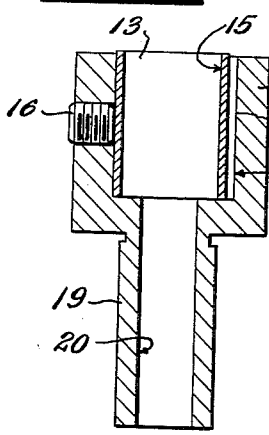
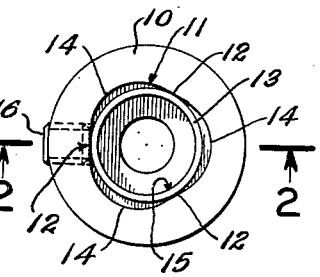
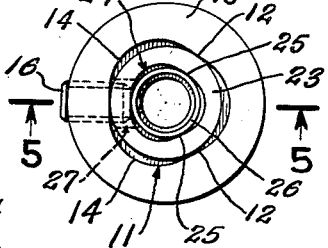
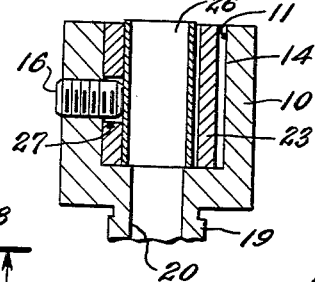
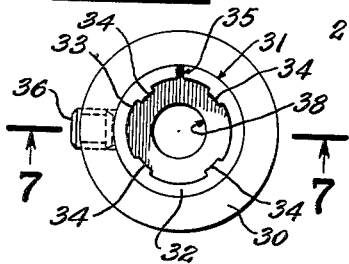
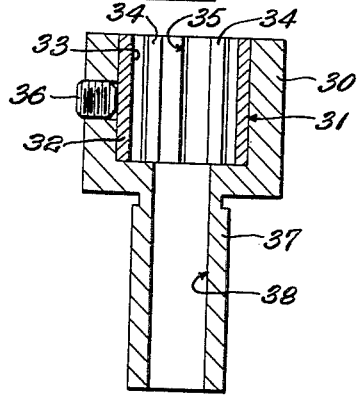
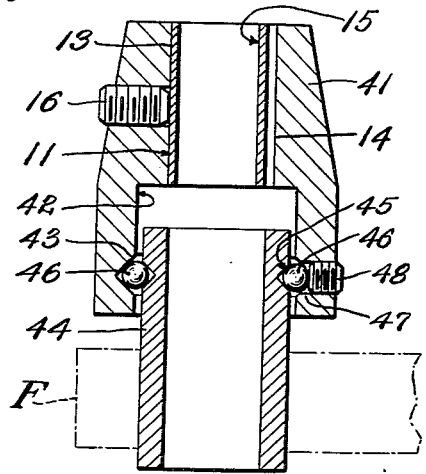
INVENTOR.
PAUL W. JOHNSON
BY
ATTORNEYS

United States Patent Office 2,938,698
Patented May 31, 1960

2,938,698

DIAL INDICATOR STEM MOUNT

Paul W. Johnson, Bloomfield, Conn., assignor to The Johnson Gage Development Company, Bloomfield, Conn., a corporation of Connecticut Filed May 13, 1958, Ser. No. 734,950

16 Claims. (Cl. 248—314)

The invention relates to a stem mount for a dial indicator by which the latter is secured to a frame or other structure by clamping the stem such that distortion does not occur in the stem which would affect the reading and operation of the indicator. The customary way of mounting a dial indicator on a piece of equipment such as a gage is to provide a hole for the stem in the frame which receives the dial indicator and thread a locking screw through the frame with the end of the locking screw engaging the surface of the stem to hold the indicator in position. The pressure exerted on the stem in order to lock the indicator on the frame is usually great enough to distort the stem with the result that the indicator contactor binds or is cramped and faulty indicator operation and readings results. Sometimes the distortion is sufficiently great so that the sliding contactor of the indicator will not slide in the stem. There is described herein a stem mounting for a dial indicator which will not distort the stem and hence leaves the sliding contactor of the indicator completely free for accurate indicator readings and without any difficulty of binding the same by the stem distortion.

It is an object of the invention to construct a new and novel stem mount for a dial indicator which effectievly grips the stem without any distortion thereof such as will affect the reading of the indicator or the free slidability of the indicator contactor within the stem.

Another object of the invention is to construct a stem mount for dial indicator having longitudinally extending internal projections or lands in the mounting member which receives a thin bushing which bushing is distorted by the projections and the pressure of a clamping screw to grip the stem without distortion or detrimental distortion of the stem.

Another object is to construct an indicator stem mounting which can be freely turned in any direction.

Other objects of the invention will be more apparent from the following description when taken in connection with the accompanying drawings illustrating preferred embodiments thereof in which:

Fig. 1 is a side view of an indicator and the stem mount;

Fig. 2 is an enlarged section of the stem mount taken on line 2—2 of Fig. 3;

Fig. 3 is a top view of the stem mount;

Fig. 4 is a top view of a stem mount with an insertable reduction bushing or adapter for receiving a smaller diameter of stem;

Fig. 5 is a cross section taken on line 5—5 of Fig. 4;

Fig. 6 is a top view of a modified construction of stem mount;

Fig. 7 is a vertical section taken on line 7—7 of Fig. 6; and

Fig. 8 is a cross section through the stem mount which also is a ball swivel mount so that the indicator may be turned to any reading position.

The stem mount is for a dial type of indicator 9 which carries a stem S and it is through this stem that the contactor C is slidable for operating the pointer of the indicator. Heretofore clamping screws directly engaging the stem in order to secure the indicator to a piece of equipment such as the frame F of a gage, will affect the operation of the contactor such that inaccurate readings or defective operation of the indicator will result. As a consequence dial manufacturers recommend that a mounting for the indicator be made on the back of the indicator rather than on the stem. The stem mount to be described enables the indicator to be secured in position by clamping the stem without affecting the operability or accuracy of the indicator.

The stem mount includes mounting means which may be a mounting member 10 having a hole 11 therein. The surface of this hole has a plurality of projections shown as continuous plain lands 12 which extend longitudinally within the hole. The width of the lands should not be too great and a width up to about 1/16 of an inch is suitable. A clamping bushing 13 which is thin enough to be distortable and having a cylindrical exterior and interior surfaces, is received in the hole and has a diameter so that its periphery engages the projections or lands. The relief portions 14 of the hole do not engage the periphery of the clamping bushing. The relief portions are shown as curved so as to provide essentially merging surfaces with the projections. The clamping bushing has a wall thickness of about 1/32 of an inch for the larger diameter of stem which stem diameter is 3/8 of an inch. For the smaller indicator stem which is 7/32 of an inch in diameter, a wall thickness for the distortable bushing of about 1/64 of an inch is used. The internal hole of the clamping bushing 15 receives the stem S of the indicator as a usual slide fit. A clamping screw 16 is threadedly received in the mounting member 10 and engages the clamping bushing to distort the same and clamp the stem. The clamping screw is located at one of the three internal projections when three are provided so that it is opposite a midpoint of the other two and hence these two are the active projections which participate in distorting the bushing when clamped by the clamping screw. These projections are spaced from each other less than 180 degrees.

The mounting member 10 preferably has a stem 19 having a hole 20 therethrough through which the indicator contactor C passes freely. Preferably the outer diameter of the stem 19 is the same as the diameter of the stem of a dial indicator so that this stem will be received in the hole in a frame intended to receive the stem S of the indicator. The stem 19 is used to mount the indicator such as being received in a hole in a frame F.

The stem of a dial indicator 9 is inserted within the clamping bushing 13 whereupon the clamping screw 16 is tightened so that it engages the bushing with sufficient pressure to distort the bushing. The projections or lands 12 distort the thin clamping bushing so that it grips the stem of the dial indicator. Measurements indicate that the bushing distorts into an oval shape such that the pressure on the stem from the bushing is distributed along a line or lines of pressure longitudinally of the stem. This distribution of the pressure is not sufficient to distort the stem or to sufficiently distort the stem to bind and affect the sliding of the contactor C within the stem S. With the indicator gripped by the stem mount, the stem 19 is inserted into the hole in the frame or other structure which is to receive the indicator.

The mounting member of the stem mount may be made in a smaller size to receive a smaller diameter of indicator stem such as the standard 7/32 inch diamater. In order to avoid the need for two complete mounting means for the two standard sizes of indicator stems the construction of Figs. 4 and 5 may be provided. The mounting member 10 is the same. The hole 11, however, receives an adaptor or adaptor bushing 23 which has a hole 24 therethrough and this hole has longitudinally extending projections or lands 25 on the inner surface thereof preferably spaced 120 degrees apart. A thin distortable clamping bushing 26 is received within the hole and engages the projections. The wall thickness for the bushing may be roughly 1/64 of an inch. The clamping screw 16 may be long enough to reach through a hole 27 in the adaptor and engage the clamping bushing. The internal diameter of this clamping bushing receives the smaller stem of the dial indicator. Merely by inserting or removing the adaptor, the stem mount may be converted or used for either stem diameter provided with dial indicators. The operation of the stem mount with the adaptor is the same as that described with the construction of Figs. 1 through 3.

The distortable clamping bushings of Figs. 1 through 5 are continuous cylindrical bushing. The stem of the dial indicator may be clamped without distorting the stem so as to affect the indicator reading by providing the longitudinally extending projections or lands on the inner surface of the distortable bushing. It has been further found that if there are four such longitudinal projections or lands, the bushing should be split. In the construction of Figs. 6 and 7 the mounting member 30 has a cylindrical hole 31 therein which receives a thin clamping bushing 32. This bushing has an internal hole 33 with longitudinal extending projections or lands 34, four being particularly shown equidistantly spaced around the interior of the hole 33. With four such projections, the bushing should have a longitudinal split 35. The periphery of the indicator stem S engages the projections 34. A clamping screw 36 is threadedly received in the mounting member and engages the distortable bushing 32 at a point roughly 90 degrees spaced from the split and between two of the internal projections. Tightening of the clamping screw distorts the distortable bushing and the gripping action is distributed along the longitudinal projections and is essentially the same as described for the construction of Figs. 1 through 5. The mounting member 30 will have a securing stem 37 which is received in a hole in a frame F or like structure which normally receives the stem of the indicator. This stem has a hole 38 extending therethrough which receives the contactor of the dial indicator with ample clearance.

It is desirable that an indicator with the stem mounting described be freely rotatable so that it can be read from any position. This construction is shown in Fig. 8 in which the mounting member 41 has a hole therethrough to receive a distortable clamping bushing of the kinds illustrated in Figs. 1 through 5 for receiving the stem of a dial indicator. This mounting member has a ball groove shown particularly as an internal V groove 43 in an enlarged hole 42 in alignment with the clamping bushing hole. A mounting sleeve 44 has a cooperating ball V groove 45 shown particularly on the outer periphery thereof since it cooperates with an internal ball groove. Balls 46 are received in the two grooves, the balls being inserted through an insertion hole 47 which is closed by a screw 48 when the balls have been inserted. The mounting sleeve 44 may be received in a hole in a frame F or other structure which is to receive the indicator. The sleeve 44 may have a dimension the same as sleeve 19 or the same as the interior dimension of the clamping bushing. In order to assure accurate reading it is necessary that there be no shake in the ball bearing mounting. To this end the grooves have a dimension with respect to the balls so that there is about .0001 of an inch bind. This bind is insufficient to prevent easy rotation of the mounting member and dial indicator carried thereby, however, it does eliminate shake and thereby assures radial and axial fixedity of mounting for the dial indicator with respect to the frame and hence with respect to the part to be gaged.

This invention is presented to fill a need for improvements in a dial indicator stem mount. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A stem mount for a dial indicator having a stem comprising mounting means having a hole therethrough, a thin distortable clamping bushing hence having a hole therethrough which bushing is received in the hole in the mounting means, the hole in the bushing having a diameter to receive the stem of a dial indicator, the surface of one of the holes having a plurality of longitudinally extending projections therein spaced from each other less than 180°, the projections having continuous plain clamping surfaces, a clamping screw threaded in the mounting means and engaging the clamping bushing to distort the same, and sleeve means carried by the mounting means for attaching the same to other structure.

2. A stem mount as in claim 1 in which the projections are carried on the surface of the hole in the mounting means and the clamping bushing is continous and has cylindrical outer and inner surfaces.

3. A stem mount as in claim 2 in which there are two active projections and the clamping screw is opposite the midpoint between the active projections.

4. A stem mount as in claim 1 in which the projections are on the inner surface of the bushing.

5. A stem mount as in claim 4 in which four uniformly spaced projections are provided and the bushing is split longitudinally between a pair of projections, and the split is located about 90° from the clamping screw.

6. A stem mount as in claim 1 in which the sleeve means is a separate part including a V-shaped ball groove carried by the mounting means, a cooperating V-shaped ball groove carried by the sleeve means, and bearing balls within the grooves to turnably mount the mounting means, the ball grooves having a dimension to receive the bearing balls with a rolling bind.

7. A stem mount as in claim 6 in which the ball groove carried by the mounting means is an internal groove, and the cooperating ball groove is an external groove, and the outer diameter of the sleeve means is the same as the inner dimension of the clamping bushing.

8. A stem mount for a dial indicator comprising a mounting member having a hole therethrough, an adapter having an outer dimension to be received in the hole in the mounting member and having a hole therethrough, the adapter having a wall with a radial passage therethrough, a thin distortable clamping bushing hence having a hole therethrough which bushing is received in the hole in the adapter, the surface of at least one of the holes having a plurality of longitudinally extending projections therein spaced from each other less than 180°, the projections having continuous plain clamping surfaces, a clamping screw threaded in the mounting member and passing through the radial passage in the wall of the adapter and engaging the clamping bushing to distort the same, and sleeve means carried by the mounting member for attaching the same to other structure.

9. A stem mount for a dial indicator comprising a mounting member having a hole therethrough, the surface of the hole of the mounting member having a plurality of longitudinally extending projections therein spaced from each other less than 180°, the projections having continuous plain clamping surfaces, an adapter having an outer dimension to be received within the projections in the hole in the mounting member and having a hole therethrough, the adapter hole having a plurality of longitudinally extending projections therein spaced from each other less than 180°, the adapter having a wall with a radial passage therethrough, bushing means including at least one thin distortable clamping bushing hence having a hole therethrough, one bushing having an outer dimension to be received within the projections in the hole in the adapter, a clamping screw threaded in the mounting member and passing through the radial passage through the wall of the adapter and engaging the clamping bushing to distort the same, and sleeve means carried by the mounting member for attaching the same to other structure.

10. A dial indicator combination comprising a dial indicator having a stem; and a stem mount for the dial indicator including mounting means having a hole therethrough, a thin distortable clamping bushing hence having a hole therethrough of a dimension to receive the indicator stem and which bushing is received in the hole in the mounting means, the surface of one of the holes having a plurality of longitudinally extending projections therein spaced from each other less than 180°, the stem of the indicator being within the bushing, the projections having continuous plain clamping surfaces, a clamping screw threaded in the mounting means and engaging the clamping bushing to distort the same, and sleeve means carried by the mounting means for attaching the same to other structure.

11. A dial indicator combination as in claim 10 in which the hole in the mounting means carries the projections, and the clamping bushing being cylindrical and the hole in the bushing being cylindrical.

12. A dial indicator combination as in claim 10 in which the mounting means includes a mounting member having a hole therethrough, an adapter having a dimension to be received in the mounting member hole and having a hole therethrough, both holes having longitudinally extending plain surfaced projections, and the bushing having a cylindrical hole.

13. A dial indicator combination as in claim 10 in which the sleeve is a separate member, the mounting means and sleeve having cooperating external and internal V shaped grooves, balls in the V grooves, and the V grooves having a dimension to receive the bearing balls with a tight rolling fit.

14. A dial indicator combination as in claim 10 in which the sleeve has an outer diameter the same as the diameter of the hole in the bushing.

15. A dial indicator combination as in claim 10 in which the projections are in the surface of the hole in the bushing.

16. A dial indicator combination as in claim 12 in which the bushing means includes a second clamping bushing having a dimension to be received in the mounting member.

References Cited in the file of this patent

UNITED STATES PATENTS

| | | |
|---|---|---|
| 482,820 | Warner | Sept. 20, 1892 |
| 1,552,104 | Zahner | Sept. 1, 1925 |
| 2,430,598 | Barsam | Nov. 11, 1947 |
| 2,469,904 | Szuba | May 10, 1949 |
| 2,633,091 | Wenger | Mar. 31, 1953 |
| 2,772,094 | Jamilkowski | Nov. 27, 1956 |